(12) United States Patent
Kim

(10) Patent No.: US 11,567,192 B2
(45) Date of Patent: Jan. 31, 2023

(54) RADAR FOR VEHICLE

(71) Applicant: LG Electronics Inc., Seoul (KR)

(72) Inventor: Sungjoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 16/500,284

(22) PCT Filed: Apr. 8, 2019

(86) PCT No.: PCT/KR2019/004129
§ 371 (c)(1),
(2) Date: Oct. 2, 2019

(87) PCT Pub. No.: WO2019/198990
PCT Pub. Date: Oct. 17, 2019

(65) Prior Publication Data
US 2021/0349206 A1    Nov. 11, 2021

Related U.S. Application Data

(60) Provisional application No. 62/655,514, filed on Apr. 10, 2018.

(51) Int. Cl.
| | | |
|---|---|---|
| *G01S 13/931* | (2020.01) | |
| *H01Q 1/32* | (2006.01) | |
| *H01Q 1/38* | (2006.01) | |
| *H01Q 13/10* | (2006.01) | |
| *H01Q 13/22* | (2006.01) | |
| *H01Q 21/00* | (2006.01) | |

(52) U.S. Cl.
CPC ......... *G01S 13/931* (2013.01); *H01Q 1/3233* (2013.01); *H01Q 1/38* (2013.01); *H01Q 13/106* (2013.01); *H01Q 13/22* (2013.01); *H01Q 21/005* (2013.01)

(58) Field of Classification Search
CPC .... H01Q 13/10; H01Q 13/106; H01Q 13/206; H01Q 13/22; H01Q 21/0043; H01Q 21/005; H01Q 11/14
See application file for complete search history.

(56) References Cited

U.S. PATENT DOCUMENTS

2016/0043475 A1* 2/2016 Izadian ............... H01Q 21/005
                                                       343/771
2018/0301815 A1* 10/2018 Kamo ................. H01Q 21/005

FOREIGN PATENT DOCUMENTS

| JP | 2013187752 | 9/2013 |
|---|---|---|
| KR | 1020090022024 | 3/2009 |
| KR | 101092846 | 12/2011 |
| KR | 1020120029213 | 3/2012 |
| KR | 1020170036093 | 3/2017 |

* cited by examiner

*Primary Examiner* — Vladimir Magloire
*Assistant Examiner* — Artem Melkunov
(74) *Attorney, Agent, or Firm* — Fish & Richardson P.C.

(57) ABSTRACT

Disclosed is a radar for a vehicle configured to detect objects around a vehicle using an antenna, and the radar includes a substrate-integrated waveguide (SIW) in which a plurality of bent slots is formed, at least one processor electrically connected to the substrate-integrated waveguide, and a differential line electrically connecting the substrate-integrated waveguide to the at least one processor.

17 Claims, 19 Drawing Sheets

200

B-B' CROSS-SECTION

RADAR FOR VEHICLE

CROSS-REFERENCE TO RELATED APPLICATIONS

This application is the National Stage filing under 35 U.S.C. 371 of International Application No. PCT/KR2019/004129, filed on Apr. 8, 2019, which claims the benefit of U.S. Provisional Application No. 62/655,514, filed on Apr. 10, 2018, the contents of both are incorporated by reference herein in their entirety.

TECHNICAL FIELD

The present invention relates to a radar for a vehicle.

BACKGROUND ART

A vehicle is an apparatus that carries a passenger in a direction intended by the passenger. A car is the main example of such a vehicle. An autonomous vehicle is a vehicle that is capable of traveling autonomously without driving operation by a driver.

In order to increase the convenience of vehicle users, a vehicle is equipped with various sensors and electronic devices. In particular, an Advanced Driver Assistance System (ADAS) is under active study with the goal of increasing the driving convenience of users. In addition, efforts are being actively made to develop autonomous vehicles.

In order to realize an ADAS or an autonomous driving function in a vehicle, a radar for a vehicle is used. A conventional vehicle radar uses a frequency range having a 1-GHz bandwidth ranging from 76 to 77 GHz in a millimeter-wave frequency band.

Recently, a vehicle radar that is usable in a frequency range having a 4-GHz bandwidth ranging from 77 to 81 GHz has been developed. In the case in which a 4-GHz bandwidth from 77 to 81 GHz is used, a vehicle radar may have a higher distance resolution due to broadband frequency characteristics. In addition, in this case, a radar may replace an ultrasonic sensor, and thus may be utilized in applications such as parking assistance or automatic parking, which require a high resolution at a short distance.

A conventional micro-strip antenna is used in a frequency range having a narrow bandwidth, e.g. a 1-GHz bandwidth, and thus is not suitable for use with a 4-GHz bandwidth. There is the need to develop a vehicle radar that is compatible with a 4-GHz bandwidth, is manufactured at low cost, and has an uncomplicated structure.

DISCLOSURE

Technical Problem

Therefore, the present invention has been made in view of the above problems, and it is an object of the present invention to provide a radar for a vehicle that is usable over a wide bandwidth.

However, the objects to be accomplished by the invention are not limited to the above-mentioned objects, and other objects not mentioned herein will be clearly understood by those skilled in the art from the following description.

Technical Solution

In accordance with the present invention, the above and other objects can be accomplished by the provision of a radar for a vehicle configured to detect objects around a vehicle using an antenna, the radar including a substrate-integrated waveguide (SIW) in which a plurality of bent slots is formed, at least one processor electrically connected to the substrate-integrated waveguide, and a differential line electrically connecting the substrate-integrated waveguide to the at least one processor.

Details of other embodiments are included in the detailed description and the accompanying drawings.

Advantageous Effects

According to the present invention, there are one or more effects as follows.

First, a radar is usable in a 4-GHz bandwidth ranging from 77 to 81 GHz while being reduced in size.

Second, a radar may be manufactured at low cost.

Third, a substrate-integrated waveguide is used, and thus is easily coupled to other components of the radar.

However, the effects achievable through the invention are not limited to the above-mentioned effects, and other effects not mentioned herein will be clearly understood by those skilled in the art from the appended claims.

BEST MODE

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

Figure 1A:
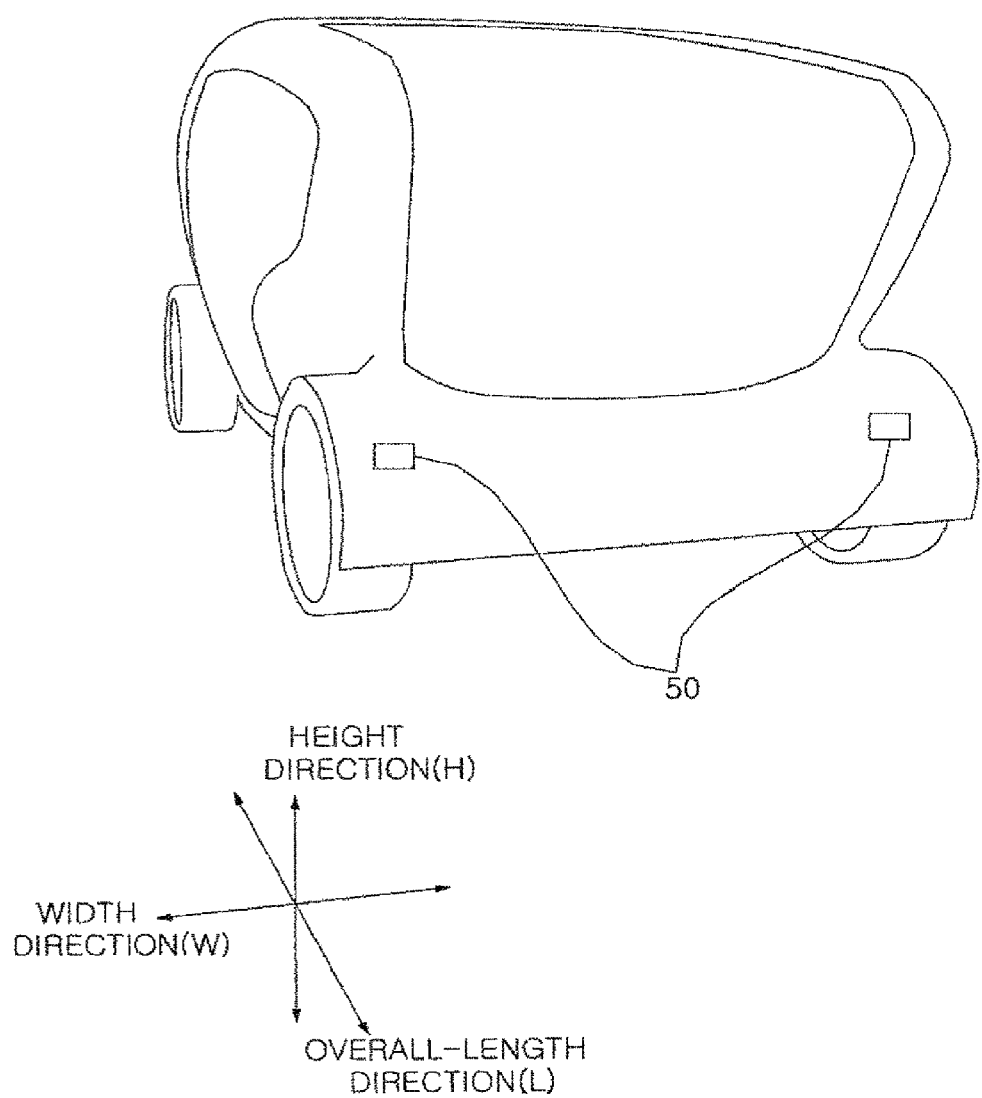
FIG. 1a is a view illustrating the external appearance of a vehicle according to an embodiment of the present invention.

FIG. 1a is a view illustrating a vehicle according to an embodiment of the present invention.

Referring to FIG. 1a, a vehicle 10 according to an embodiment of the present invention is defined as a transportation means that travels on a road or a railroad. The vehicle 10 conceptually encompasses cars, trains, and motorcycles. The vehicle 10 may be any of an internal combustion vehicle equipped with an engine as a power source, a hybrid vehicle equipped with an engine and an electric motor as power sources, an electric vehicle equipped with an electric motor as a power source, and the like. The vehicle 10 may be a shared vehicle. The vehicle 10 may be an autonomous vehicle.

Figure 1B:
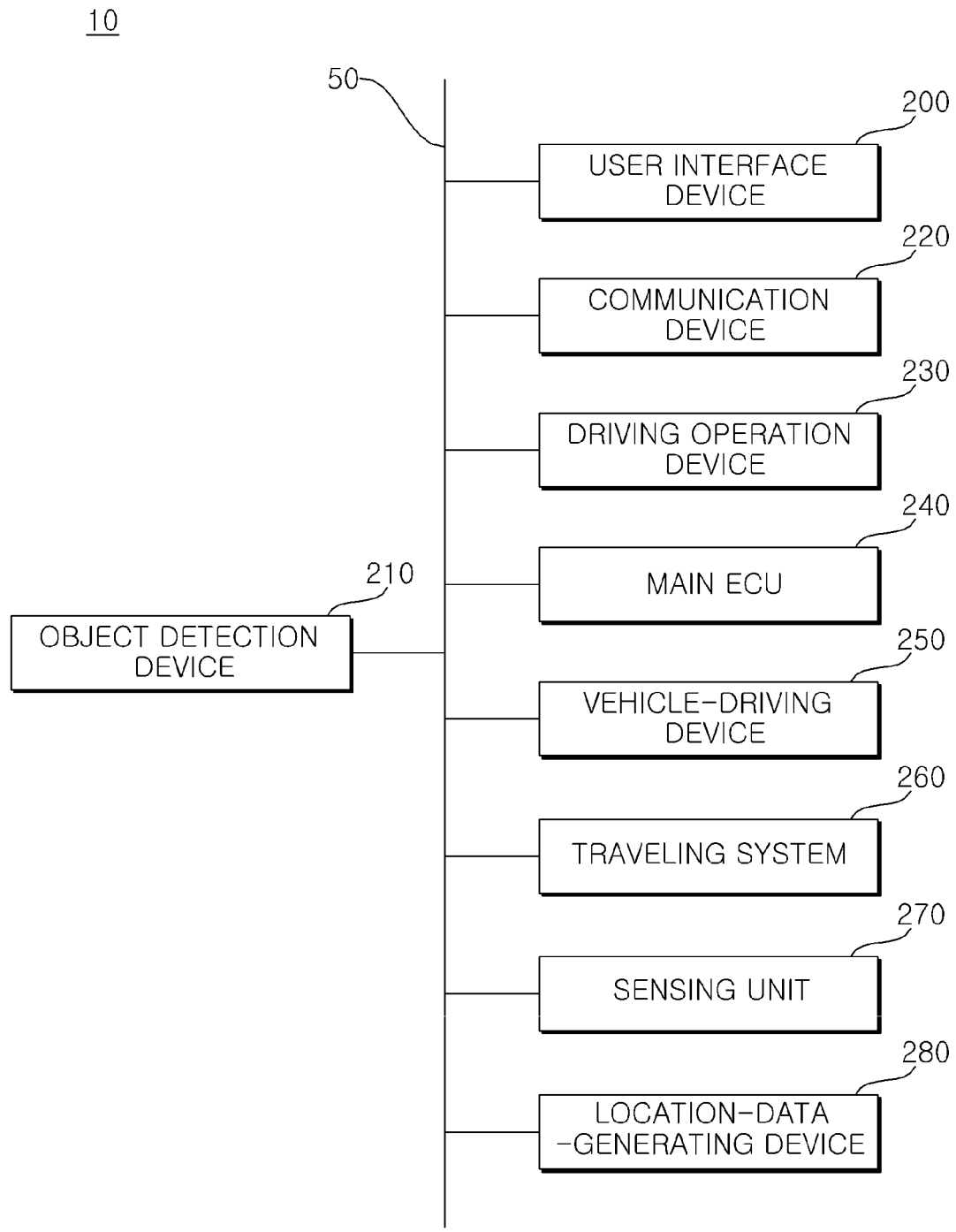
FIG. 1b is a control block diagram of the vehicle according to the embodiment of the present invention.

FIG. 1b is a control block diagram of the vehicle according to the embodiment of the present invention.

Referring to FIG. 1b, the vehicle 10 may include a user interface device 200, an object detection device 210, a communication device 220, a driving operation device 230, a main ECU 240, a vehicle-driving device 250, a traveling system 260, a sensing unit 270, and a location-data-generating device 280.

The user interface device 200 is a device used to enable the vehicle 10 to communicate with a user. The user interface device 200 may receive user input and may provide information generated from the vehicle 10 to the user. The vehicle 10 may implement User Interfaces (UIs) or a User Experience (UX) through the user interface device 200.

The object detection device 210 may detect objects present outside the vehicle 10. The object detection device 210 may include at least one sensor capable of detecting objects present outside the vehicle 10. The object detection device 210 may include at least one of a camera, a radar 50, a lidar, an ultrasonic sensor, or an infrared sensor. The object detection device 210 may provide data on an object, which is generated based on a sensing signal generated from the sensor, to at least one electronic device included in the vehicle.

The camera may generate information about an object present outside the vehicle 10 using an image. The camera may include at least one lens, at least one image sensor, and at least one processor, which is electrically connected to the image sensor in order to process a received signal and to generate data on an object based on the processed signal.

The camera may be at least one of a mono camera, a stereo camera, or an around view monitoring (AVM) camera. The camera may acquire information about the location of an object, information about the distance to an object, or information about the relative speed with respect to an object using any of various image-processing algorithms. For example, the camera may acquire information about the distance to an object and information about the relative speed with respect to the object in the acquired image based on variation in the size of the object over time. For example, the camera may acquire information about the distance to an object and information about the relative speed with respect to the object through a pin hole model, road surface profiling, or the like. For example, the camera may acquire information about the distance to an object and information about the relative speed with respect to the object based on disparity information in the stereo image acquired by the stereo camera.

In order to capture an image of the outside of the vehicle, the camera may be mounted at a position in the vehicle at which it is capable of securing a field of view (FOV). In order to acquire an image of the front view of the vehicle, the camera may be disposed in the vicinity of a front windshield inside the vehicle. The camera may be disposed around a front bumper or a radiator grille. In order to acquire an image of the rear view of the vehicle, the camera may be disposed in the vicinity of a rear glass inside the vehicle. The camera may be disposed around a rear bumper, a trunk, or a tailgate. In order to acquire a lateral image of the vehicle, the camera may be disposed in the vicinity of at least one of side windows inside the vehicle. Alternatively, the camera may be disposed around a side view mirror, a fender, or a door.

The radar 50 may generate information about an object present outside the vehicle 10 using electronic waves. The radar 50 may include an electromagnetic wave transmitter, an electromagnetic wave receiver, and at least one processor, which is electrically connected to the electromagnetic wave transmitter and the electromagnetic wave receiver in order to process a received signal and to generate data on an object based on the processed signal. The radar 50 may be implemented in a pulse radar scheme or a continuous wave radar scheme according to the principle of electronic wave emission. The radar 50 may be implemented in a Frequency Modulated Continuous Wave (FMCW) scheme or a Frequency Shift Keying (FSK) scheme as a continuous wave radar scheme according to a signal waveform. The radar 50 may detect an object using an electromagnetic wave based on a Time-of-Flight (ToF) scheme or a phase-shift scheme, and may detect the location of the detected object, the distance to the detected object, and the relative speed with respect to the detected object. The radar 50 may be disposed at an appropriate position on the exterior of the vehicle in order to sense an object ahead of, behind, or beside the vehicle.

The lidar may generate information about an object present outside the vehicle 10 using laser light. The lidar may include a light transmitter, a light receiver, and at least one processor, which is electrically connected to the light transmitter and the light receiver in order to process a received signal and to generate data on an object based on the processed signal. The lidar may be implemented in a Time-of-Flight (ToF) scheme or a phase-shift scheme. The lidar may be implemented in a driven or non-driven manner. When the lidar is implemented in a driven manner, the lidar may be rotated by a motor and may detect objects around the vehicle 10. When the lidar is implemented in a non-driven manner, the lidar may detect objects present within a predetermined range from the vehicle through optical steering. The vehicle 10 may include a plurality of non-driven-type lidars. The lidar may detect an object using laser light based on a Time-of-Flight (ToF) scheme or a phase-shift scheme, and may detect the location of the detected object, the distance to the detected object, and the relative speed with respect to the detected object. The lidar may be disposed at an appropriate position on the exterior of the vehicle in order to sense an object ahead of, behind, or beside the vehicle.

The communication device 220 may exchange signals with devices located outside the vehicle 10. The communication device 220 may exchange signals with at least one of an infrastructure (e.g. a server or a broadcasting station) or other vehicles. In order to realize communication, the communication device 220 may include at least one of a transmit antenna, a receive antenna, or a Radio Frequency (RF) circuit and device capable of implementing various communication protocols.

The driving operation device 230 is a device that receives user input for driving the vehicle. In the manual mode, the vehicle 10 may travel based on a signal provided by the driving operation device 230. The driving operation device 230 may include a steering input device (e.g. a steering wheel), an acceleration input device (e.g. an accelerator pedal), and a brake input device (e.g. a brake pedal).

The main ECU 240 may control the overall operation of at least one electronic device provided in the vehicle 10.

The driving control device 250 is a device that electrically controls various vehicle-driving devices provided in the vehicle 10. The driving control device 250 may include a powertrain driving controller, a chassis driving controller, a door/window driving controller, a safety device driving controller, a lamp driving controller, and an air conditioner driving controller. The powertrain driving controller may include a power source driving controller and a transmission driving controller. The chassis driving controller may include a steering driving controller, a brake driving controller, and a suspension driving controller.

The safety device driving controller may include a seat belt driving controller for controlling the seat belt.

The vehicle driving control device 250 may be referred to as a control electronic control unit (a control ECU).

The traveling system 260 may generate a signal for controlling the movement of the vehicle 10 or outputting information to the user based on the data on an object received from the object detection device 210. The traveling system 260 may provide the generated signal to at least one of the user interface device 200, the main ECU 240, or the vehicle-driving device 250.

The traveling system 260 may conceptually include an ADAS. The ADAS 260 may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), High Beam Assist (HBA), Auto Parking System (APS), PD collision warning system, Traffic Sign Recognition (TSR), Traffic Sign Assist (TSA), Night Vision (NV), Driver Status Monitoring (DSM), or Traffic Jam Assist (TJA).

The traveling system 260 may include an autonomous-travel electronic control unit (an autonomous-travel ECU). The autonomous-travel ECU may set an autonomous-travel route based on data received from at least one of the other electronic devices provided in the vehicle 10. The autonomous-travel ECU may set an autonomous-travel route based on data received from at least one of the user interface device 200, the object detection device 210, the communication device 220, the sensing unit 270, or the location-data-generating device 280. The autonomous-travel ECU may generate a control signal so that the vehicle 10 travels along the autonomous-travel route. The control signal generated from the autonomous-travel ECU may be provided to at least one of the main ECU 240 or the vehicle-driving device 250.

The sensing unit 270 may sense the state of the vehicle. The sensing unit 270 may include at least one of an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. The inertial navigation unit (IMU) sensor may include at least one of an acceleration sensor, a gyro sensor, or a magnetic sensor.

The sensing unit 270 may generate data on the state of the vehicle based on the signal generated from at least one sensor. The sensing unit 270 may acquire sensing signals of vehicle attitude information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle attitude information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The sensing unit may include a tension sensor. The tension sensor may generate a sensing signal based on the tension state of the seat belt.

The location-data-generating device 280 may generate data on the location of the vehicle 10. The location-data-generating device 280 may include at least one of a global positioning system (GPS) or a differential global positioning system (DGPS). The location-data-generating device 280 may generate data on the location of the vehicle 10 based on the signal generated by at least one of the GPS or the DGPS. In some embodiments, the location-data-generating device 280 may correct the location data based on at least one of the inertial measurement unit (IMU) of the sensing unit 270 or the camera of the object detection device 210.

The location-data-generating device 280 may be referred to as a location positioning device. The location-data-generating device 280 may be referred to as a global navigation satellite system (GNSS).

The vehicle 10 may include an internal communication system 50. The electronic devices included in the vehicle 10 may exchange signals via the internal communication system 50. The signals may include data. The internal communication system 50 may use at least one communication protocol (e.g. CAN, LIN, FlexRay, MOST, and Ethernet).

Figure 1C:
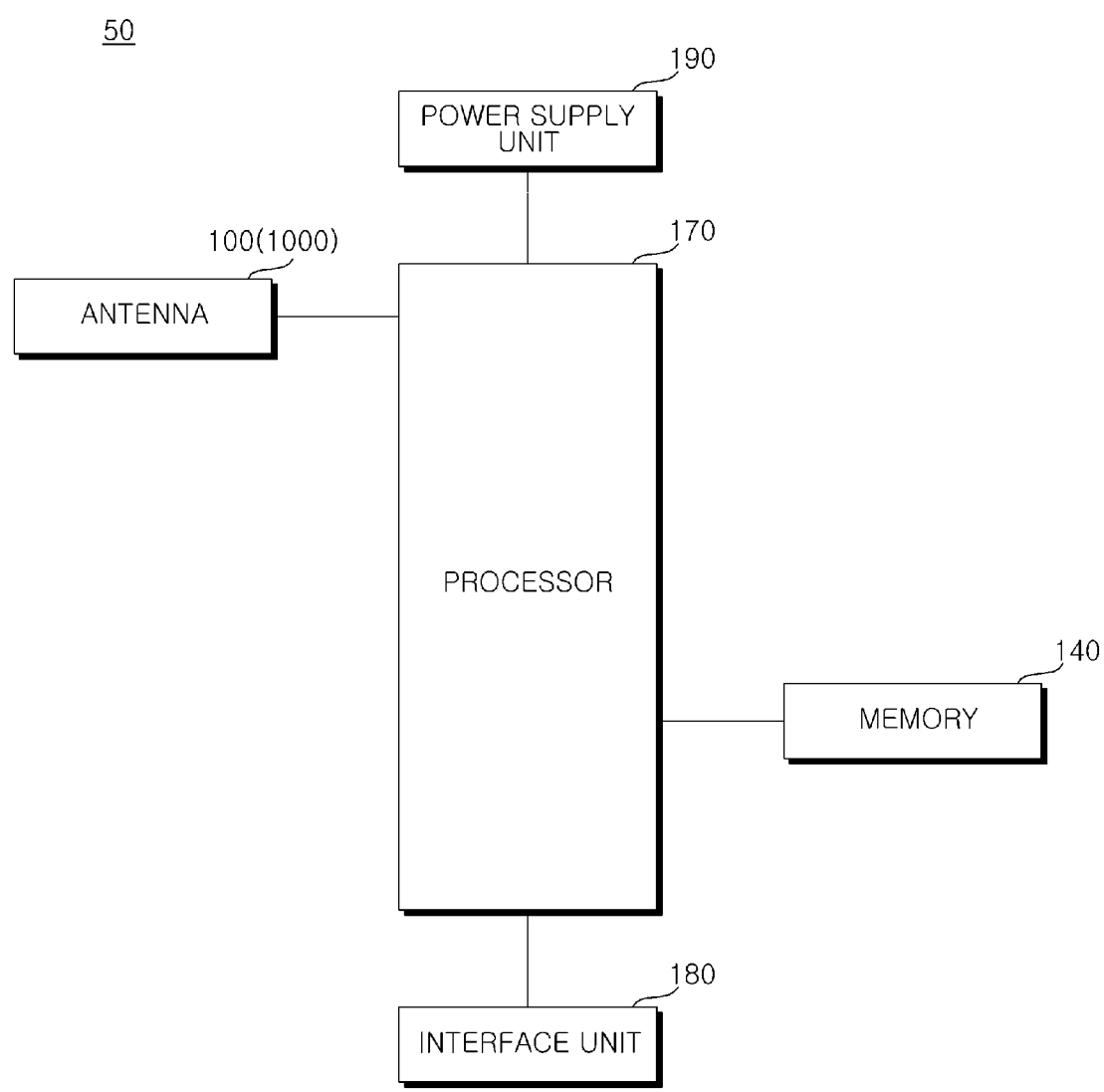
FIG. 1c is a control block diagram of a vehicle radar according to the embodiment of the present invention.

FIG. 1c is a control block diagram of the vehicle radar according to the embodiment of the present invention.

Referring to FIG. 1c, the vehicle radar 50 may include at least one antenna 100 or 1000, at least one memory 140, at least one processor 170, at least one interface unit 180, and a power supply unit 190.

The radar 50 may detect an object around the vehicle 10. The radar 50 may acquire the location of the detected object, the distance to the detected object, and the relative speed with respect to the detected object.

The antenna 100 or 1000 may output an electronic wave and may receive a reflected electronic wave. The antenna 100 or 1000 will be described in detail with reference to FIGS. 2 to 12. The antenna 100 or 1000 may function as a transmit antenna and a receive antenna. In some embodiments, the radar 50 may include a transmit antenna and a receive antenna, which are provided separately.

The memory 140 is electrically connected to the processor 170. The memory 140 may store default data for a unit, control data for controlling the operation of the unit, and input and output data. The memory 140 may store data processed by the processor 170. The memory 140 may be implemented as at least one hardware device selected from among read only memory (ROM), random access memory (RAM), erasable and programmable ROM (EPROM), a flash drive, or a hard drive. The memory 140 may store various data for the overall operation of the vehicle radar 50, such as programs for processing or control in the processor 170. The memory 140 may be integrated with the processor 170. In some embodiments, the memory 140 may be configured as a lower-level component of the processor 170.

The interface unit 180 may exchange signals with at least one electronic device provided in the vehicle 10 in a wired or wireless manner. The interface unit 280 may exchange signals with at least one of the object detection device 210, the communication device 220, the driving operation device 230, the main ECU 140, the vehicle-driving device 250, the ADAS 260, the sensing unit 170, or the location-data-generating device 280 in a wired or wireless manner. The interface unit 280 may be configured as at least one of a communication module, a terminal, a pin, a cable, a port, a circuit, an element, or a device.

The interface unit 180 may receive location data of the vehicle 10 from the location-data-generating device 280. The interface unit 180 may receive travel speed data from the sensing unit 270. The interface unit 180 may receive data on an object present around the vehicle from the object detection device 210.

The power supply unit 190 may supply power to the vehicle radar 50. The power supply unit 190 may receive power from a power source (e.g. a battery) included in the vehicle 10, and may supply the power to each unit of the vehicle radar 50. The power supply unit 190 may be operated in response to a control signal from the main ECU 140. The power supply unit 190 may be implemented as a switched-mode power supply (SMPS).

The processor 170 may be electrically connected to the memory 140, the interface unit 280, and the power supply unit 190, and may exchange signals with the same. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions.

The processor 170 may be driven by the power supplied from the power supply unit 190. The processor 170 may receive data, process data, generate a signal, and provide a signal while receiving the power from the power supply unit 190.

The processor 170 may receive information from other electronic devices provided in the vehicle 10 through the interface unit 180. The processor 170 may provide a control signal to other electronic devices provided in the vehicle 10 through the interface unit 180.

The devices for implementing the vehicle radar 50 according to the present invention may be implemented as a monolithic microwave integrated circuit (MMIC). For example, at least one of the antenna 100 or 1000, the memory 140, the processor 170, the interface unit 180, or the power supply unit 190 may be implemented as an MMIC.

The vehicle radar 50 may include at least one printed circuit board (PCB). The memory 140, the interface unit 180, the power supply unit 190, and the processor 170 may be electrically connected to the printed circuit board.

Figure 2:
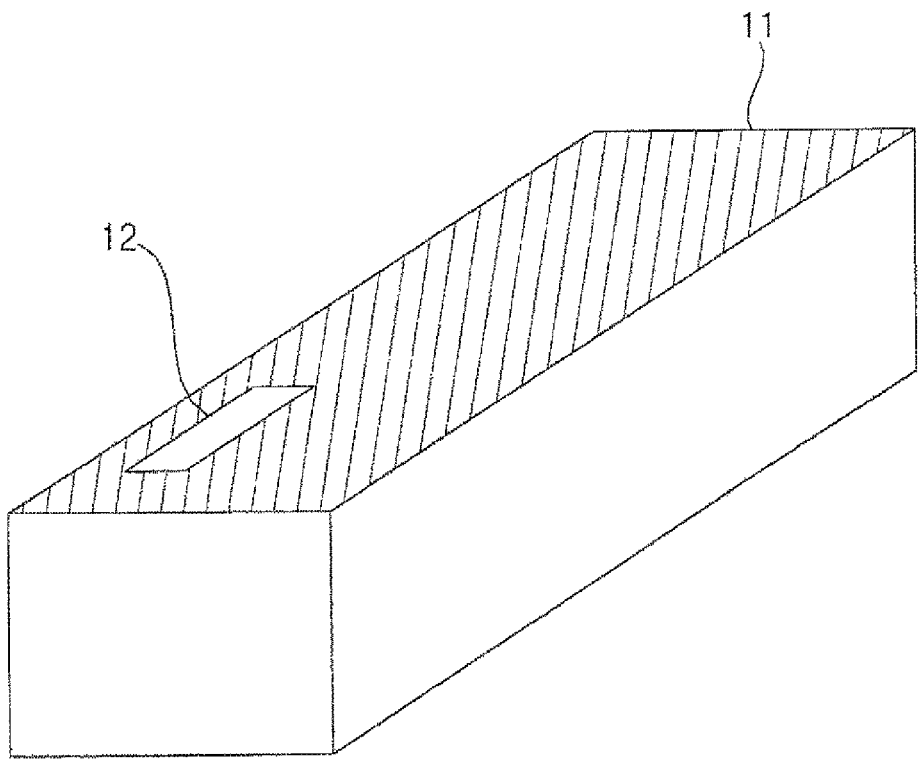
FIG. 2 is a view illustrating a conventional slot antenna.

FIG. 2 is a view illustrating a conventional slot antenna.

Referring to FIG. 2, a conventional slot antenna 10 is configured such that a slot is formed in one surface of a waveguide 11 to radiate an electromagnetic wave to a free space.

As illustrated in FIG. 2, the conventional slot antenna 10 is usable over a wide bandwidth, but the volume of the waveguide thereof is too large to be used for a vehicle. In order to solve this problem, a slot antenna according to an embodiment of the present invention is proposed.

Figure 3:
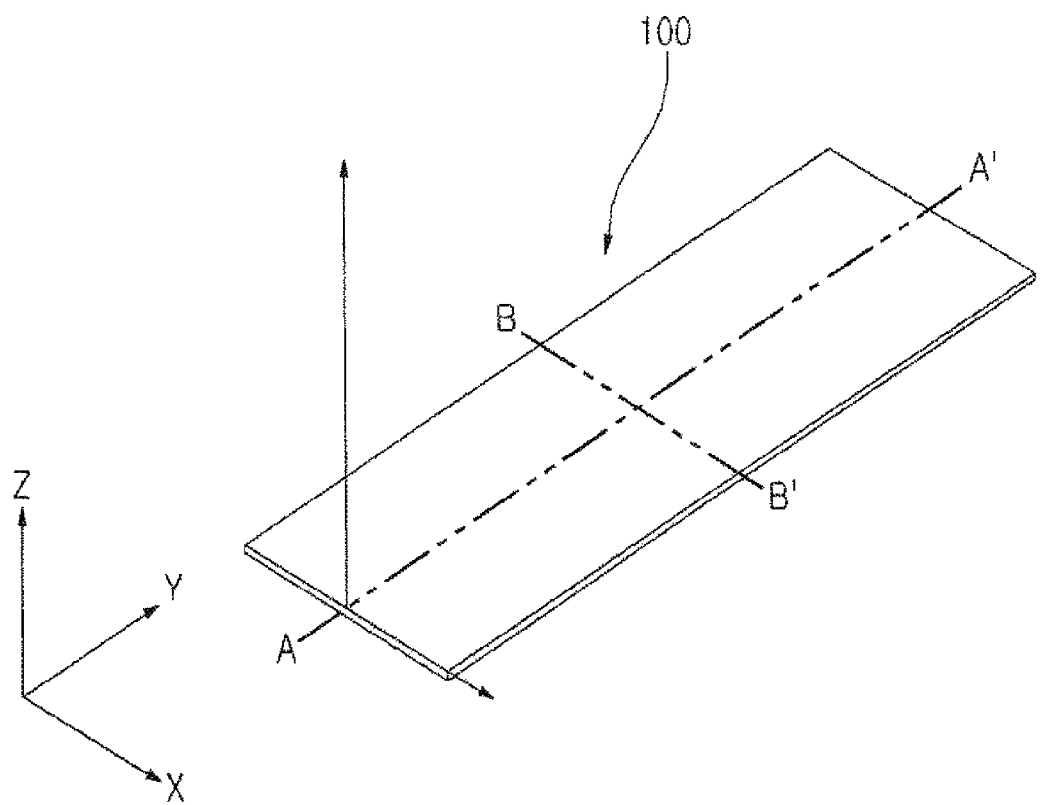
FIG. 3 is a perspective view of a slot antenna according to an embodiment of the present invention.
Figure 4:
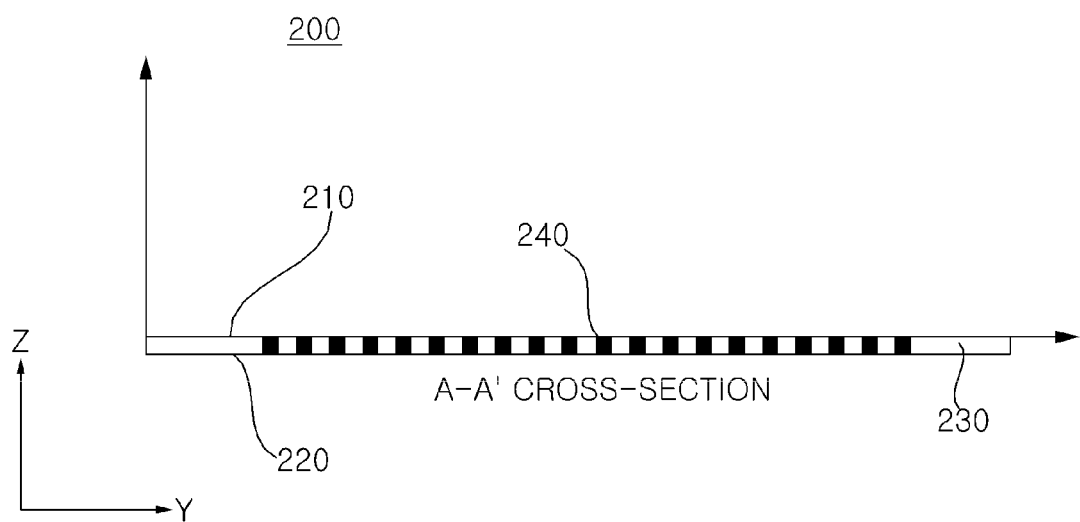
FIG. 4 is a cross-sectional view taken along line A-A' in FIG. 3.
Figure 5:
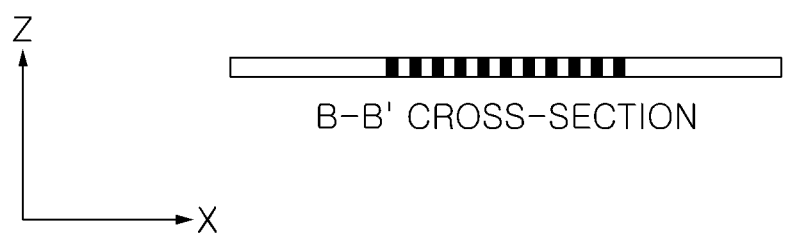
FIG. 5 is a cross-sectional view taken along line B-B' in FIG. 3.
Figure 6:
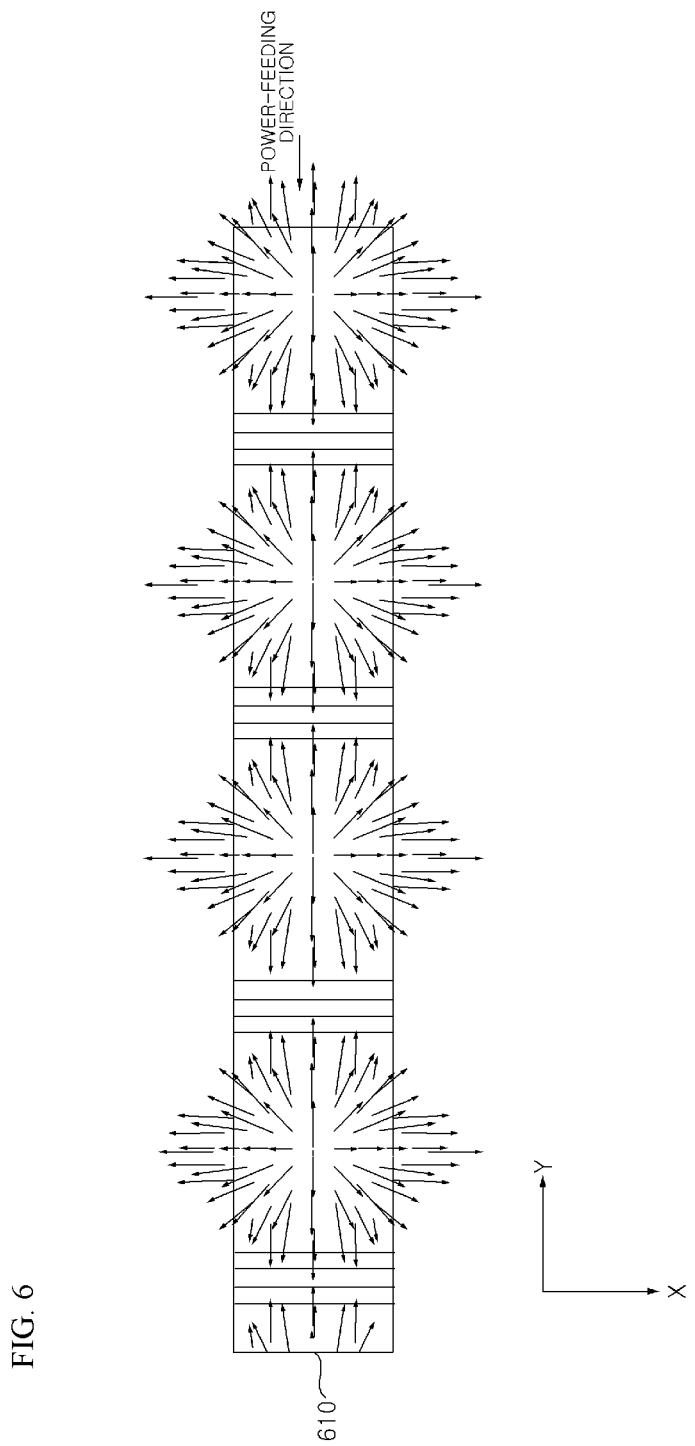
FIG. 6 shows surface current at a certain time point in a substrate-integrated waveguide according to an embodiment of the present invention.
Figure 7:
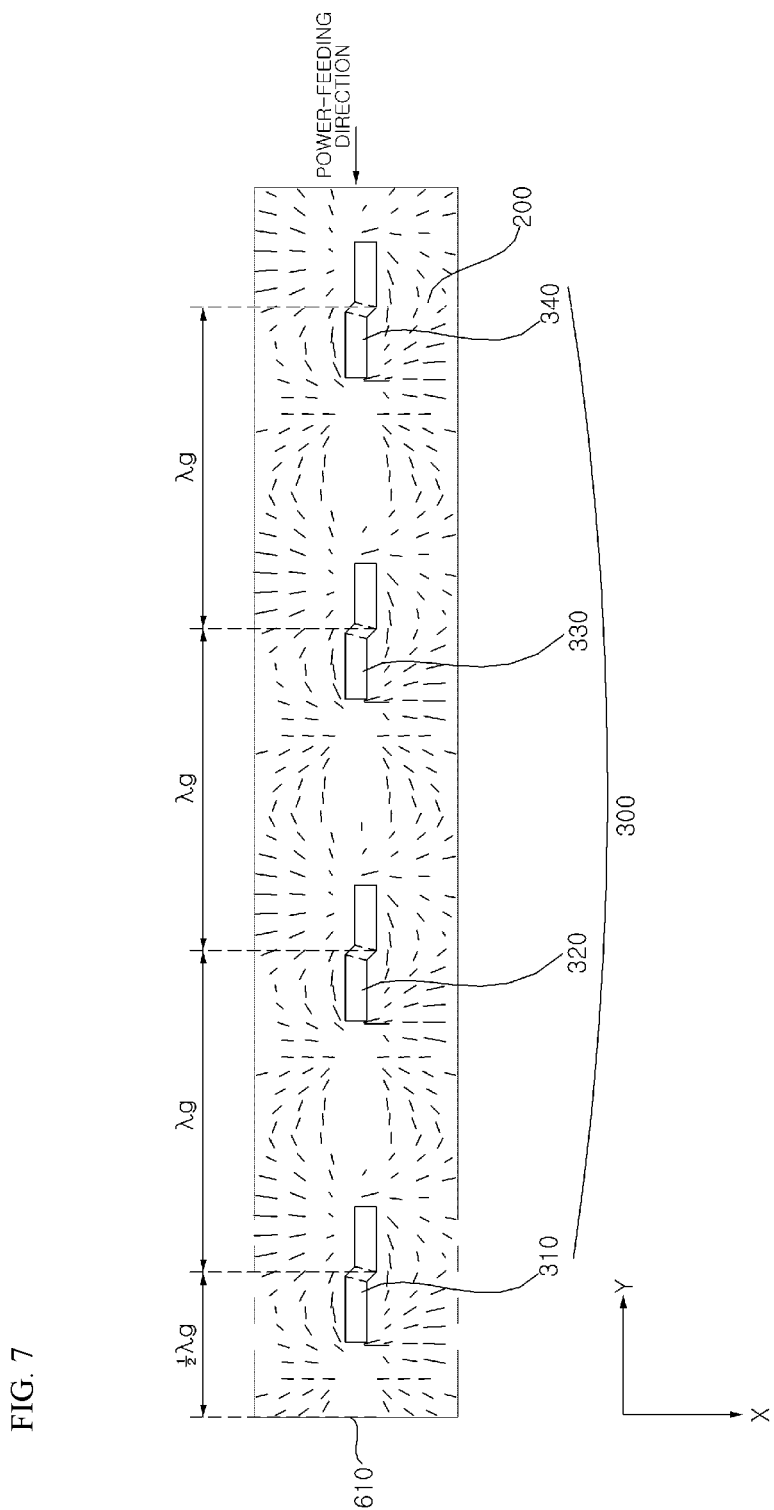
FIG. 7 is a view of the slot antenna according to the embodiment of the present invention when viewed from above.
Figure 8:
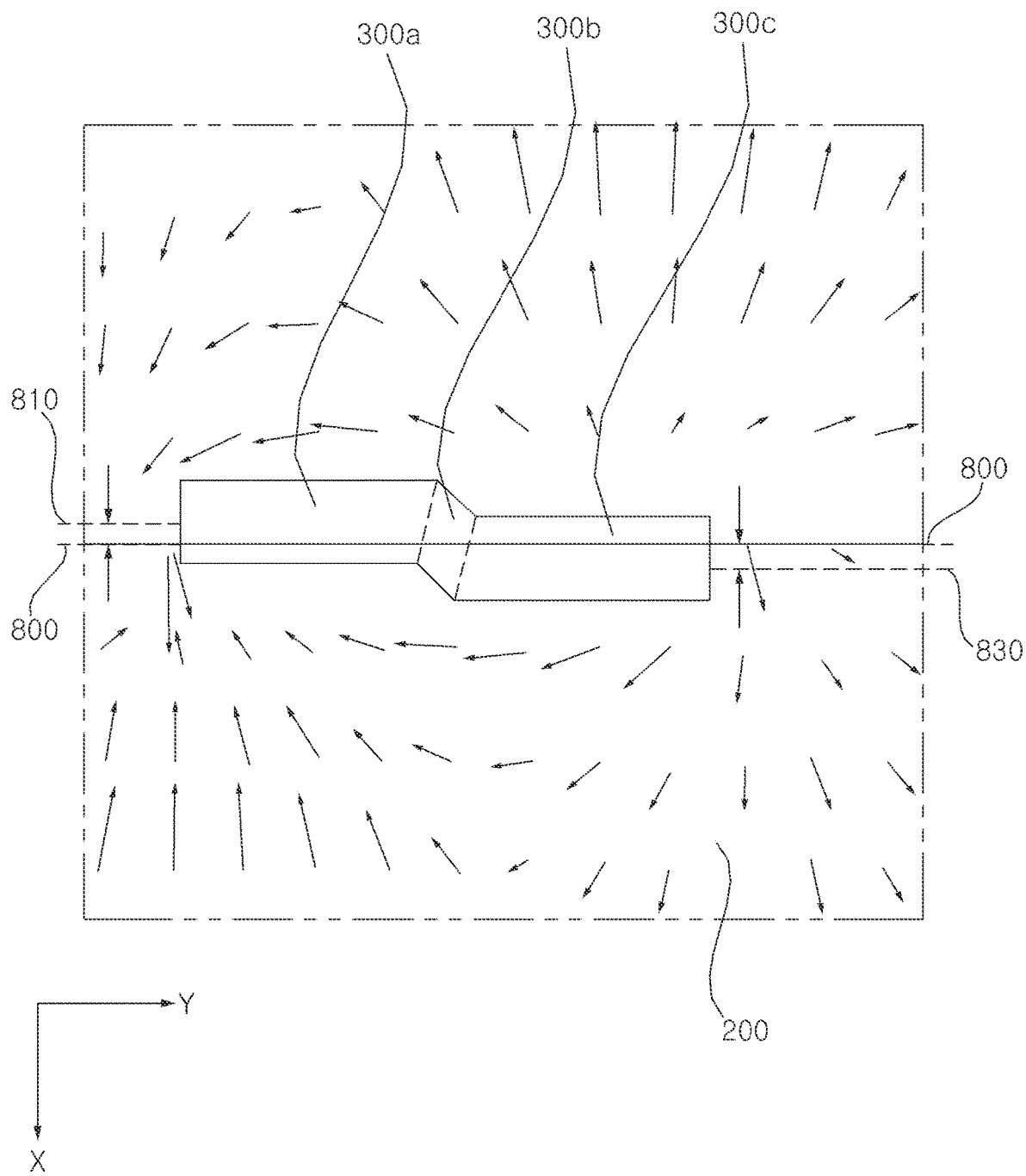
FIG. 8 is an enlarged view of a portion of FIG. 7.

FIG. 3 is a perspective view of a slot antenna according to an embodiment of the present invention. FIG. 4 is a cross-sectional view taken along line A-A' in FIG. 3. FIG. 5 is a cross-sectional view taken along line B-B' in FIG. 3. FIG. 6 shows surface current at a certain time point in a substrate-integrated waveguide according to an embodiment of the present invention. FIG. 7 is a view of the slot antenna according to the embodiment of the present invention when viewed from above. FIG. 8 is an enlarged view of a portion of FIG. 7.

Referring to FIGS. 3 to 8, the antenna 100 may include a substrate-integrated waveguide (SIW) 200. In the substrate-integrated waveguide, surface current may be distributed in a TE10 mode.

The substrate-integrated waveguide 200 may be implemented using a printed circuit board (PCB). Via holes may be formed so as to surround a specific region of the PCB, and a metal may be inserted into the via holes to form the substrate-integrated waveguide 200. The via holes formed so as to surround a specific region of the PCB may be referred to as a via fence.

As such, since the substrate-integrated waveguide 200 is implemented using a PCB, the electrical connection with the electronic component of the radar 50 (e.g. a monolithic microwave integrated circuit (MMIC) or a micro controller unit (MCU)) may be facilitated, and the volume occupied by the radar 50 in the vehicle may be minimized. In addition, a wide bandwidth may be utilized compared to a related art.

The substrate-integrated waveguide 200 may include a first metal plate 210, a second metal plate 220, a dielectric 230, and a via fence.

The first metal plate 210 may be formed of copper (Cu). The first metal plate 210 may be referred to as a copper foil or a copper plate.

The second metal plate 220 may be formed of copper (Cu). The second metal plate 210 may be referred to as a copper foil or a copper plate. The second metal plate 220 may be in electrical communication with the first metal plate via the plurality of via holes 240. The plurality of via holes 240 may be formed so as to surround a specific region. The via holes may be referred to as a via fence.

The dielectric 230 may be located between the first metal plate 210 and the second metal plate 220. The dielectric 230 may be a low-loss dielectric.

The substrate-integrated waveguide 200 may be defined as a three-dimensional shape that is surrounded by the via fence and has a length, a width, and a height. The longitudinal direction of the substrate-integrated waveguide 200 may be understood as the Y and −Y directions in FIG. 3. The width direction of the substrate-integrated waveguide 200 may be understood as the X and −X directions in FIG. 3. The height direction of the substrate-integrated waveguide 200 may be understood as the Z and −Z directions in FIG. 3.

When power is fed to the substrate-integrated waveguide 200, surface current may be formed in the substrate-integrated waveguide 200. The surface current may be formed in at least one of the first metal plate 210 or the second metal plate 210. Since a short-circuited surface is formed by the via fence, the surface current may have the form of a standing wave. The short-circuited surface may be formed in the surface 610 of the substrate-integrated waveguide 200 that is opposite the surface of the substrate-integrated waveguide 200 to which power is fed (refer to FIG. 6).

The substrate-integrated waveguide 200 may have a guide wavelength kg.

A plurality of bent slots 300 may be formed in the substrate-integrated waveguide 200.

The plurality of bent slots 300 may be formed in the first metal plate 210.

The plurality of bent slots 300 may make the surface current of the substrate-integrated waveguide 200 discontinuous. As such, since the surface current of the substrate-integrated waveguide 200 is made discontinuous, an electromagnetic wave may be radiated to a free space.

As illustrated in FIG. 8, each of the plurality of slots 300 may include a first slot 300a, a second slot 300b, and a third slot 300c. The first slot 300a may extend long in the longitudinal direction of the substrate-integrated waveguide 200. The second slot 300b may be formed so as to extend from an end of the first slot in a direction different from the longitudinal direction. The third slot 300c may extend long from an end of the second slot in the longitudinal direction.

The substrate-integrated waveguide 200 may have a first slot 300a extending long in the longitudinal direction (e.g. the Y direction) of the substrate-integrated waveguide, a second slot 300b formed so as to extend from an end of the first slot 300a in a direction (e.g. a diagonal direction) different from the longitudinal direction, and a third slot 300c extending long from an end of the second slot 300b in the longitudinal direction (e.g. the Y direction).

The first slot 300a may be formed so as to be offset from an imaginary center line 800 of the substrate-integrated waveguide 200, which extends in the longitudinal direction, in a first direction (e.g. the −X direction). An imaginary center line 810 in the horizontal direction of the first slot 300a may be spaced apart from the imaginary center line 800 of the substrate-integrated waveguide 200, which extends in the longitudinal direction, by a first distance D in the first direction (e.g. the −X direction).

The third slot 300c may be formed so as to be offset from the imaginary center line 800 of the substrate-integrated waveguide 200, which extends in the longitudinal direction, in a direction (e.g. the X direction) opposite the first direction. A center line 830 in the horizontal direction of the third slot 300c may be spaced apart from the imaginary center line 800 of the substrate-integrated waveguide 200, which extends in the longitudinal direction, by the first distance D in the direction (e.g. the X direction) opposite the first direction. Here, the distance is the same as the distance between the center line 810 of the first slot and the center line 800.

One end of the second slot 300b may be connected to the first slot 300a, and the opposite end of the second slot 300b may be connected to the third slot 300c. At least a portion of the second slot 300b may intersect the imaginary center line 800 of the substrate-integrated waveguide 200, which extends in the longitudinal direction.

As such, since the first slot 300a is offset in the first direction and the third slot 300c is offset in the direction opposite the first direction, an electromagnetic wave may be radiated in response to variation in the phase of the current over time, and may be capable of being radiated over a wide bandwidth.

As illustrated in FIG. 7, the substrate-integrated waveguide 200 may have a first bent slot 310 and a second bent slot 320 formed therein.

The first bent slot 310 may be formed such that the center thereof is located at a point spaced apart from the short-circuited surface 610 by half the guide wavelength kg in the longitudinal direction of the substrate-integrated waveguide 200. The center of the first bent slot 310 may be understood as a center point in the longitudinal direction of the first bent slot 310. The center of the first bent slot 310 may be located in the imaginary center line 800 of the substrate-integrated waveguide 200, which extends in the longitudinal direction.

The second bent slot 320 may be formed such that the center thereof is located at a point spaced apart from the first bent slot 310 by the guide wavelength kg in the longitudinal direction of the substrate-integrated waveguide 200. The center of the second bent slot 320 may be understood as a center point in the longitudinal direction of the second bent slot 310. The center of the second bent slot 320 may be located in the imaginary center line 800 of the substrate-integrated waveguide 200, which extends in the longitudinal direction.

In some embodiments, the substrate-integrated waveguide 200 may have a larger number of bent slots 330 and 340 formed therein. The bent slots 300 may be spaced apart from each other by the guide wavelength kg.

Each of the bent slots 300 may have a length corresponding to a half wavelength of the resonant frequency for transmitting and receiving electromagnetic waves.

Figure 9:
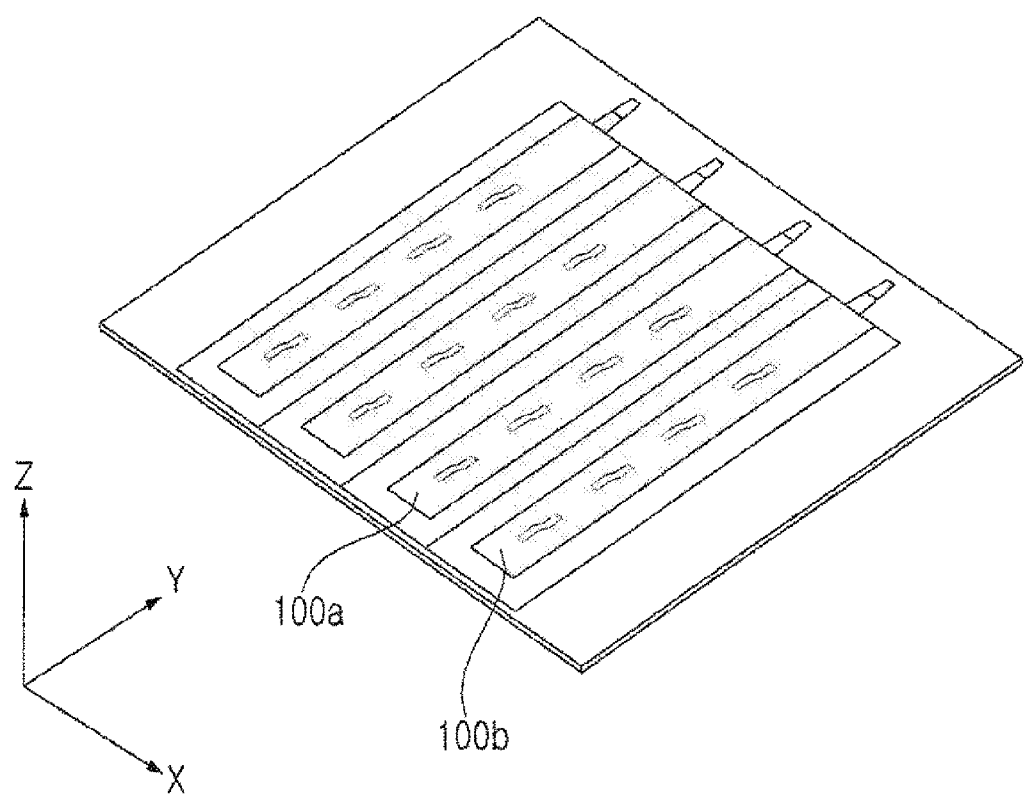
FIGS. 9 and 10 are views for explaining a slot array antenna according to an embodiment of the present invention.
Figure 10:
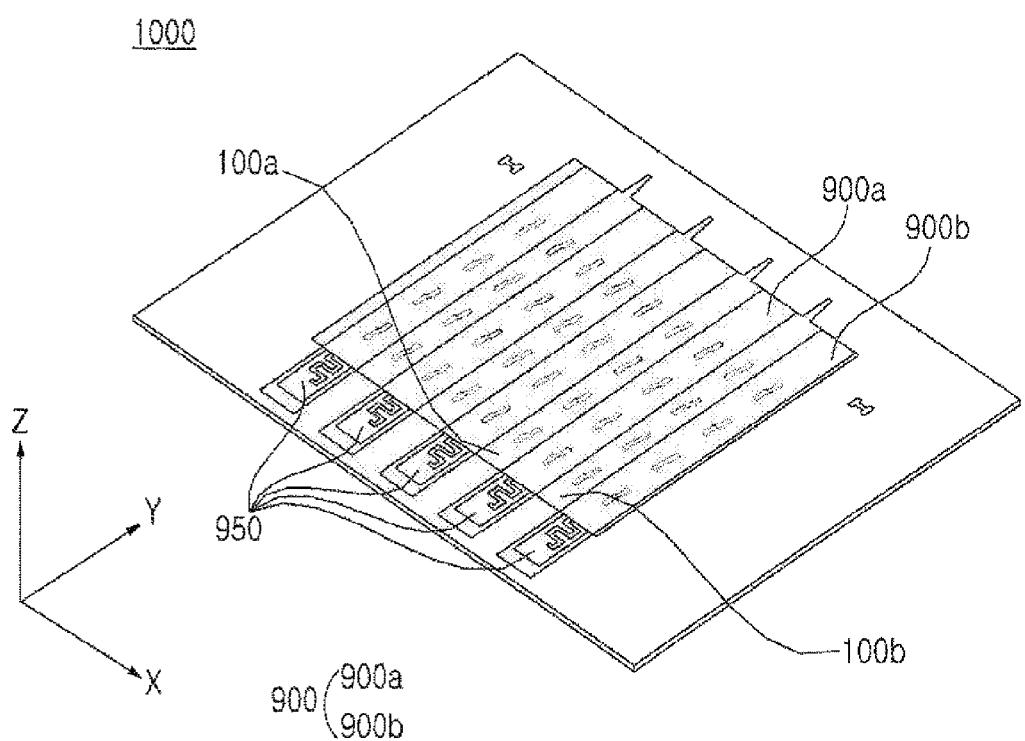

FIGS. 9 and 10 are views for explaining a slot array antenna according to an embodiment of the present invention.

FIG. 9 illustrates a slot array antenna including a plurality of slot antennas.

Referring to FIG. 9, a slot array antenna 1000 may include a plurality of slot antennas 100. The description of the slot antenna 100 made with reference to FIGS. 1 to 8 may be applied to the plurality of slot antennas 100.

The slot array antenna 1000 is provided in the radar 50 for detecting objects around the vehicle 100.

The slot array antenna 1000 may include a first slot antenna 100a and a second slot antenna 100b electrically connected to the first slot antenna 100a.

The first slot antenna 100a may include a first substrate-integrated waveguide in which a plurality of bent slots is formed. The description of the bent slots 300 made with reference to FIGS. 1 to 8 may be applied to the plurality of bent slots. The description of the substrate-integrated waveguide 200 made with reference to FIGS. 1 to 8 may be applied to the first substrate-integrated waveguide.

The second slot antenna 100b may include a second substrate-integrated waveguide in which a plurality of bent slots is formed. The description of the bent slots 300 made with reference to FIGS. 1 to 8 may be applied to the plurality of bent slots. The description of the substrate-integrated waveguide 200 made with reference to FIGS. 1 to 8 may be applied to the second substrate-integrated waveguide.

FIG. 10 illustrates a slot array antenna including a plurality of slot antennas and a plurality of dummy antennas.

Referring to FIG. 10, an edge effect may occur at the slot array antenna 1000 in FIG. 9. The slot antenna disposed on the outer side and the slot antenna disposed on the inner side have different characteristics (e.g. impedance characteristics), which may affect the overall performance of the slot array antenna 1000. In addition, the slot antennas interfere with each other, which may distort the overall radiation pattern of the slot array antenna 1000.

In order to prevent distortion of the radiation pattern, the slot array antenna 1000 may further include at least one dummy antenna 900, which is located around at least one of the first slot antenna 100a or the second slot antenna 100b.

The slot antenna 100 described with reference to FIGS. 1 to 8 may be used as the at least one dummy antenna 900. The dummy antenna 900 is not connected to the electronic devices of the radar 50 or other antennas.

The at least one dummy antenna 900 may be located between the slot antennas 100. The at least one dummy antenna 900 may be located between the first slot antenna 100a and the second slot antenna 100b. The at least one dummy antenna 900 may be located on an outer side of the antenna located at the outermost position among the plurality of slot antennas 100.

The slot array antenna 1000 may further include at least one terminator 950, which is connected to a corresponding dummy antenna for the impedance matching of the dummy antenna 900. The terminator 950 and the dummy antenna 900 may be provided in a plural number, and the number of terminators 950 may be the same as the number of dummy antennas 900.

The slot antenna 100 is connected to the electronic component of the radar 50 in an impedance-matched state. However, the dummy antenna 900 is not connected to the electronic component of the radar 50, and thus the terminator 950 for realizing impedance matching is required.

The terminator 950 may be implemented by forming a predetermined pattern on the PCB through etching or the like. The pattern may have a shape in which a single line zigzags in the width direction and the longitudinal direction of the substrate-integrated waveguide 200 so as not to intersect itself.

The terminator 950 may be formed in a different layer from the first slot antenna 100a and the second slot antenna 100b. The reason why the terminator 950 is located in a different layer from the first slot antenna 100a and the second slot antenna 100b is to prevent the terminator 950 from affecting the transmitting/receiving functions of the first slot antenna 100a and the second slot antenna 100b.

The dummy antenna 900 may be located in the same layer as the first slot antenna 100a and the second slot antenna 100b. A slot may be formed in at least a portion of the dummy antenna 900 so as to penetrate the dummy antenna 900. The electrical connection with the terminator 950, which is located in a different layer from the dummy antenna 900, may be realized through the slot. The slot formed in the dummy antenna 900 may have an H shape.

Figure 11:
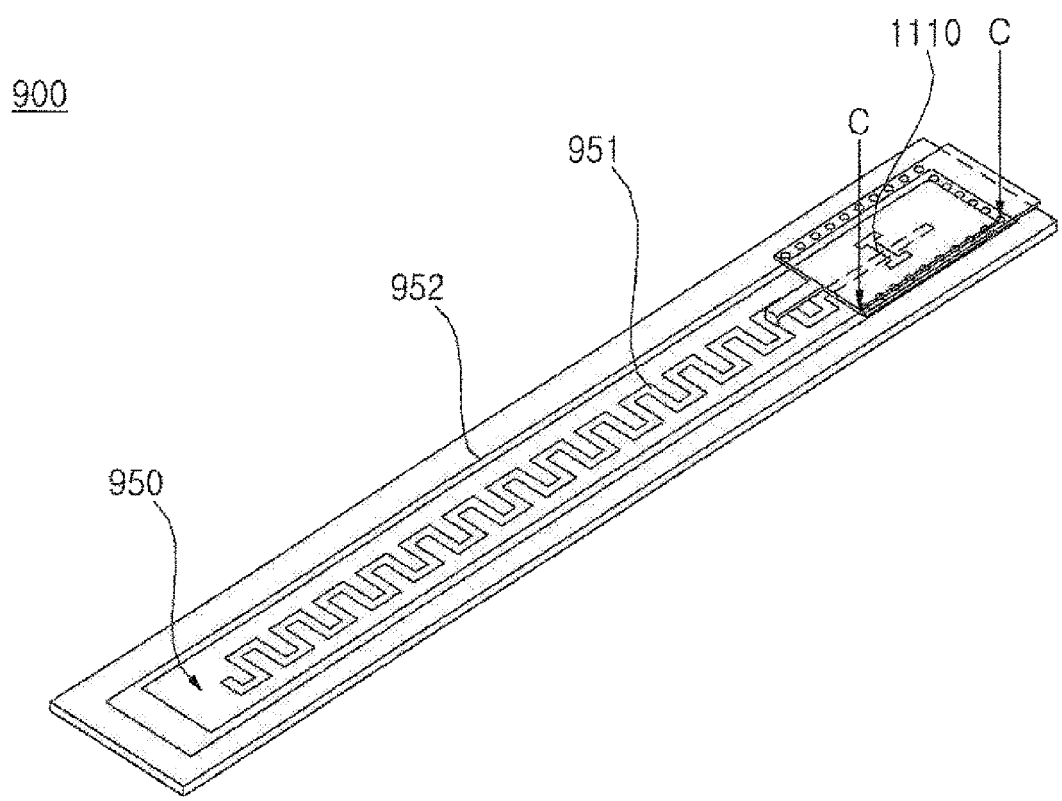
FIG. 11 is a view for explaining a terminator according to an embodiment of the present invention.

FIG. 11 is a view for explaining the terminator according to an embodiment of the present invention.

Figure 12:
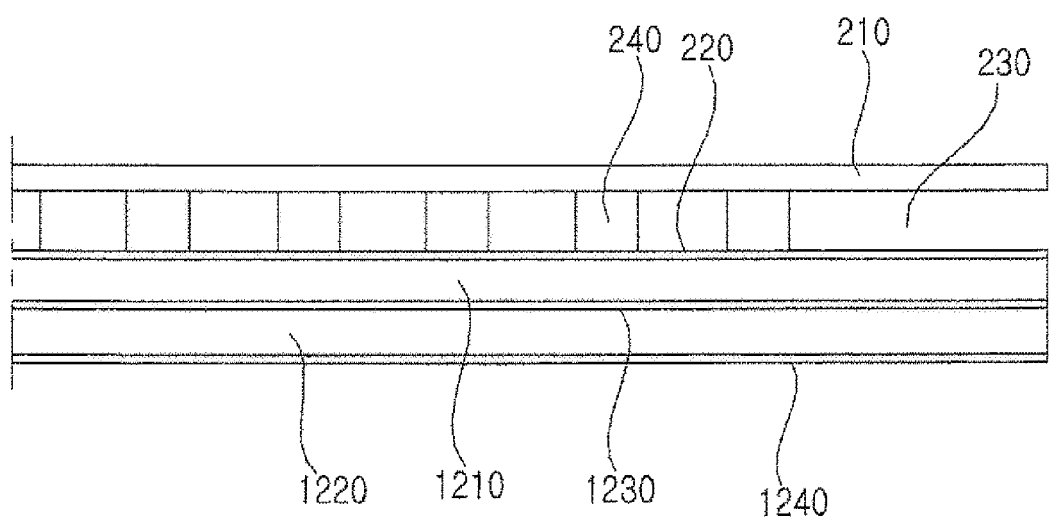
FIG. 12 is a cross-sectional view taken along line C-C in FIG. 11.

FIG. 12 is a cross-sectional view taken along line C-C in FIG. 11.

Referring to FIGS. 11 and 12, the dummy antenna 900 may include a first metal plate 210, a second metal plate 220, a dielectric 230, a via fence 240, a third metal plate 1230, a fourth metal plate 1240, a first high-loss dielectric 1210, and a second high-loss dielectric 1220.

The description made with reference to FIGS. 1 to 10 may be applied to the first metal plate 210, the second metal plate 220, the dielectric 230, and the via fence 240.

The terminator 950 may include a third metal plate 1230, a fourth metal plate 1240, a first high-loss dielectric 1210, and a second high-loss dielectric 1220.

The third metal plate 1230 may be formed of copper (Cu). The third metal plate 1230 may be referred to as a copper foil or a copper plate. The third metal plate 1230 may be disposed between the first high-loss dielectric 1210 and the second high-loss dielectric 1220.

The third metal plate 1230 may include a first strip line 951 and a second strip line 952. The first strip line 951 may be formed so as to have a shape in which a single line zigzags in the width direction and the longitudinal direction so as not to intersect itself. The second strip line 951 may be formed in a shape that surrounds the first strip line 952.

The fourth metal plate 1240 may be formed of copper (Cu). The fourth metal plate 1240 may be referred to as a copper foil or a copper plate.

The first high-loss dielectric 1210 may be disposed between the second metal plate 220 and the third metal plate 1230.

The second high-loss dielectric 1220 may be disposed between the third metal plate 1230 and the fourth metal plate 1240.

The second metal plate 220 may have an H-shaped slot 1110 formed therein. A signal from the substrate-integrated waveguide 200 may be transmitted to the terminator 950 through the H-shaped slot formed in the second metal plate 220.

The strip line 951, which is surrounded by the first high-loss dielectric 1210 and the second high-loss dielectric 1220, has high loss due to the first high-loss dielectric 1210 and the second high-loss dielectric 1220. The signal transmitted through the H-shaped slot 1110 is lost due to the first micro strip 951 and the first and second high-loss dielectrics 1210 and 1220. In this case, the second strip line 952 may prevent signal leakage in order to prevent influence on other antennas.

Figure 13:
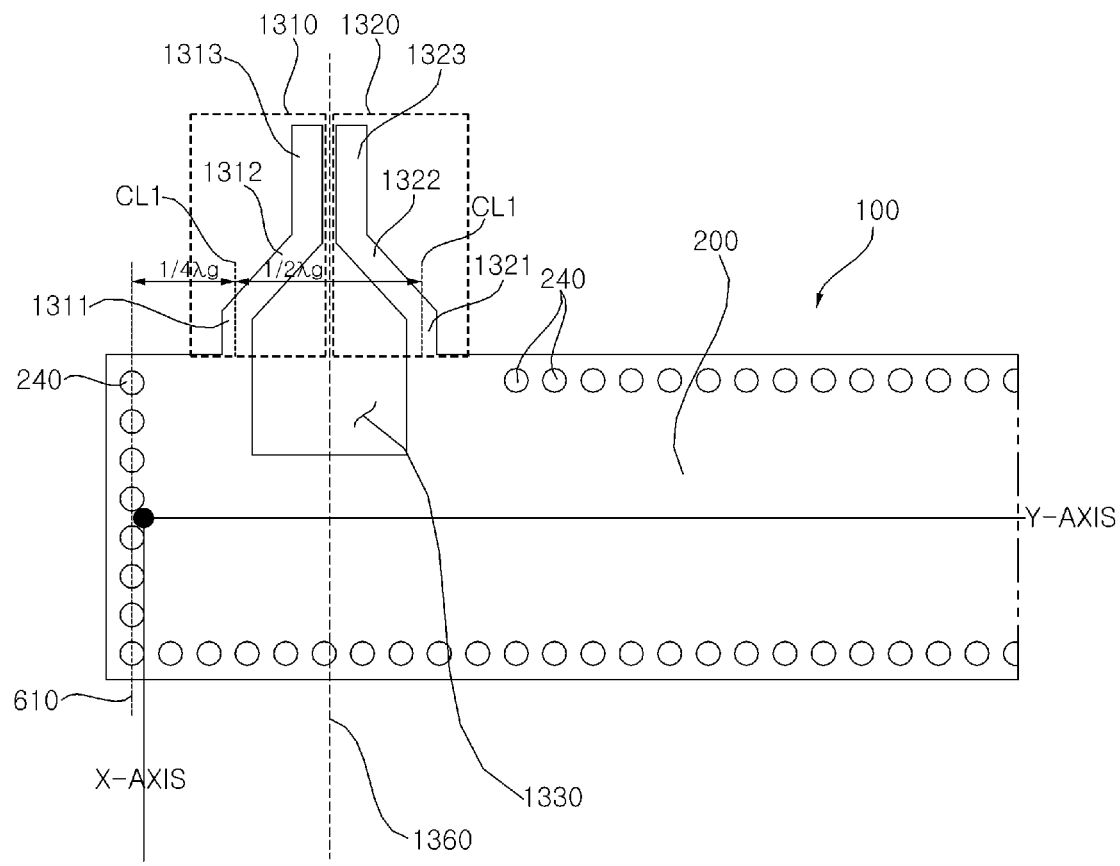
FIG. 13 is a view illustrating a portion of the slot antenna according to the embodiment of the present invention.

FIG. 13 is a view illustrating a portion of the slot antenna according to the embodiment of the present invention.

Referring to FIG. 13, the vehicle radar 50 may detect objects around the vehicle 10. The vehicle radar 50 may include a slot antenna 100, which includes a substrate-integrated waveguide (SIW) in which a plurality of bent slots is formed, at least one processor 170 (refer to FIG. 1c) electrically connected to the slot antenna 100, and a differential line 1300 for electrically connecting the slot antenna 100 to the at least one processor 170.

The differential line 1300 may include a first line 1310 and a second line 1320. The first line 1310 may extend from a portion of the substrate-integrated waveguide 200 in the width direction of the substrate-integrated waveguide. The second line 1320 may be formed so as to be spaced apart from the first line 1310. The second line 1320 may extend from a portion of the substrate-integrated waveguide 200 in the width direction of the substrate-integrated waveguide.

The center line CL1 of the first line 1310 may be formed at a point spaced apart from the short-circuited surface 240 of the substrate-integrated waveguide 200 by a fourth of the guide wavelength in the longitudinal direction of the substrate-integrated waveguide 200. The short-circuited surface 240 may be a boundary surface that is shorted and serves as a ground. The short-circuited surface 240 may be a point at which the impedance becomes zero and a standing wave is formed. The center line CL1 of the first line 1310 may be a line equally dividing the width of the first line 1310. The first line 1310 may be disposed at a first point. The first point may be a point at which the surface current value (or the absolute value of the surface current) in the width direction is maximized. The surface current may flow from the substrate-integrated waveguide 200 to the first line 1310 through the first point at a first time point. The surface current may flow from the first line 1310 to the substrate-integrated waveguide 200 through the first point at a second time point. In some embodiments, the center line CL1 of the first line 1310 may be formed at a point spaced apart from the short-circuited surface 240 by (n+¼) times the guide wavelength. Here, n may be a natural number.

The center line CL2 of the second line 1320 may be formed at a point spaced apart from the center line CL1 of the first line 1310 by half the guide wavelength in the longitudinal direction. The center line CL2 of the second line 1320 may be a line equally dividing the width of the second line 1320. The second line 1320 may be disposed at a second point. The second point may be a point at which the phase is opposite the phase at the first point and at which the surface current value (or the absolute value of the surface current) in the width direction is maximized. The surface current may flow from the second line 1320 to the substrate-integrated waveguide 200 through the second point at the first time point. The surface current may flow from the substrate-integrated waveguide 200 to the second line 1320 through the second point at the second time point. In some embodiments, the center line CL2 of the second line 1320 may be formed at a point spaced apart from the center line CL1 of the first line 1310 by half the guide wavelength in the longitudinal direction.

The arrangement relationship between the center line CL1 of the first line 1310 and the center line CL2 of the second line 1320 may be changed depending on variation in the length of the differential line 1300.

The via holes 240 may be removed around the portion of the substrate-integrated waveguide 200 in which the differential line 1300 is formed. Due to the removal of the via holes 240, current may flow between the substrate-integrated waveguide 200 and the differential line 1300.

The second line 1320 may be formed symmetrically to the first line 1310 with respect to an imaginary line 1360 formed between the first line 1310 and the second line 1320.

The first line 1310 may include a first sub line 1311, a second sub line 1312, and a third sub line 1313. The first sub line 1311 may extend from the substrate-integrated waveguide 200 in the width direction. The second sub line 1312 may extend from the first sub line 1311 toward the second line 1320 while forming an acute angle or an obtuse angle with the first sub line 1311. The third sub line 1313 may extend from the second sub line 1312 in the width direction. The third sub line 1313 may form an acute angle or an obtuse angle with the second sub line 1312. The connection portion between the first sub line 1311 and the second sub line 1312 may be formed so as to be rounded. The connection portion between the second sub line 1312 and the third sub line 1313 may be formed so as to be rounded.

The second line 1320 may include a first sub line 1321, a second sub line 1322, and a third sub line 1323. The first sub line 1321 may extend from the substrate-integrated waveguide 200 in the width direction. The second sub line 1322 may extend from the first sub line 1321 toward the first line 1310 while forming an acute angle or an obtuse angle with the first sub line 1321. The third sub line 1323 may extend from the second sub line 1322 in the width direction. The third sub line 1323 may form an acute angle or an obtuse angle with the second sub line 1322. The connection portion between the first sub line 1321 and the second sub line 1322 may be formed so as to be rounded. The connection portion between the second sub line 1322 and the third sub line 1323 may be formed so as to be rounded. The second line 1320 may be the same length as the first line 1310. Even when the second line 1320 is a different length from the first line 1310, the features of the present invention may be accomplished by adjusting the point that the waveguide enters. It is preferable that the lengths of the first line 1310 and the second line 1320 be short.

The substrate-integrated waveguide 200 may have a slot 1330 formed between the first line 1310 and the second line 1320. The location and the length of the slot 1330 are related to impedance matching. The slot 1330 may be formed symmetrically with respect to the imaginary line 1360 formed between the first line 1310 and the second line 1320. The depth in the width direction of the slot 1330 may be set so as not to cross the center line in the width direction of the substrate-integrated waveguide 200. It is preferable that the size of the slot 1330 increase in the longitudinal direction of the substrate-integrated waveguide 200.

FIGS. 14a to 15b are views for explaining the differential line according to the embodiment of the present invention.

Figure 16:
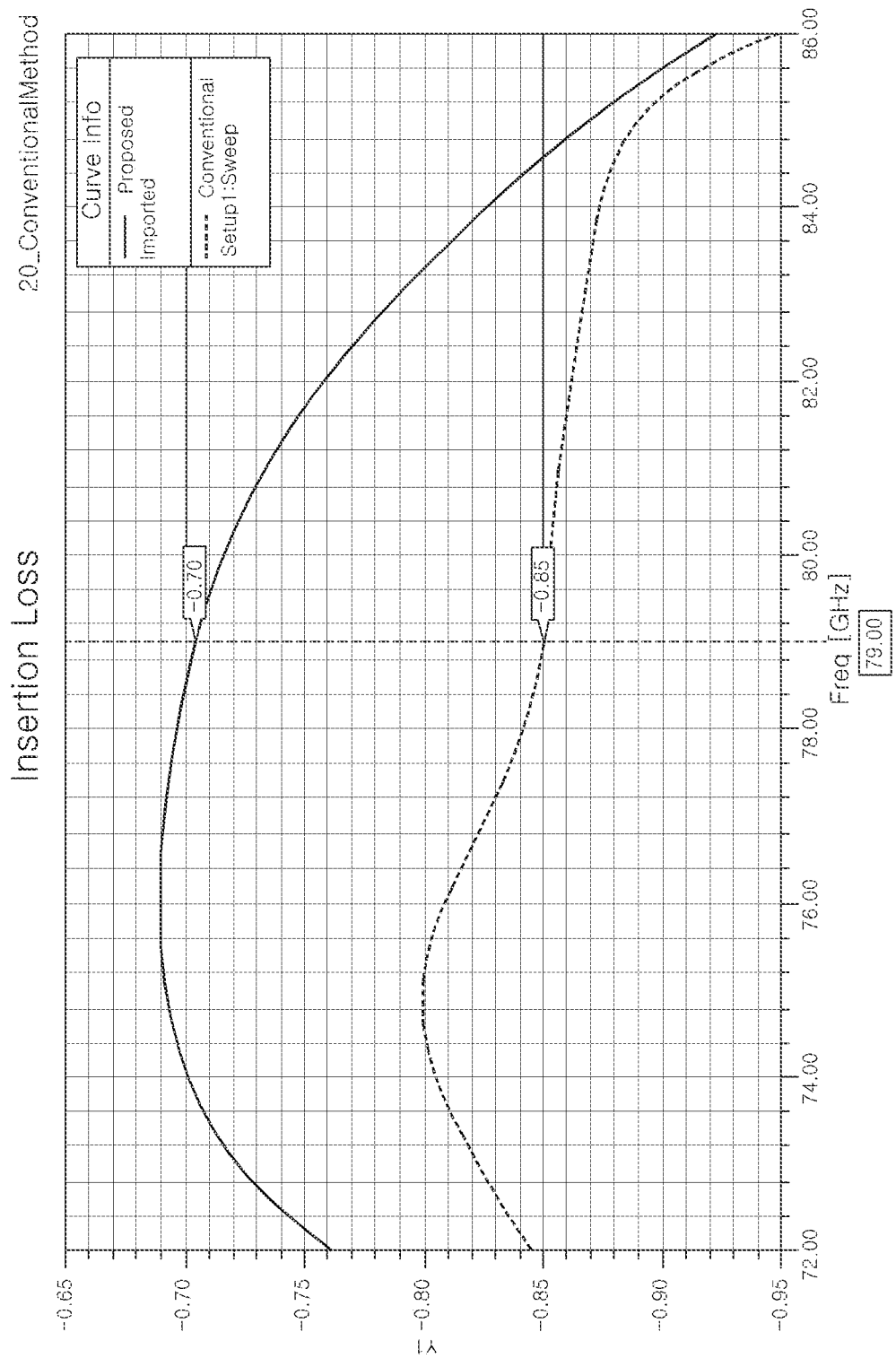
FIG. 16 is a view for explaining the effect obtained by the differential line according to the embodiment of the present invention.

FIG. 16 is a view for explaining the effect obtained by the differential line according to the embodiment of the present invention.

The vehicle radar is divided into a frequency range having a 1-GHz bandwidth ranging from 76 to 77 GHz and a frequency range having a 4-GHz bandwidth ranging from 77 to 81 GHz in a millimeter-wave frequency band. A frequency range having a 1-GHz bandwidth is mainly used to detect an object ahead of the vehicle at a long distance (up to 200 m) and thus is utilized for ACC or AEB. A frequency range having a 4-GHz bandwidth, which has recently attracted attention, has a high distance resolution due to broadband frequency characteristics. Thus, the radar may be utilized in applications such as parking assistance or automatic parking, which require a high resolution at a short distance (up to tens of meters), and may replace an ultrasonic sensor in the future.

Hardware devices supporting a 4-GHz frequency band are required. Among hardware devices, a chip and an antenna, which perform transmitting and receiving functions, are actually used in a millimeter-wave band. To this end, a chip (e.g. the processor 170 in FIG. 1c and/or the memory 140 in FIG. 1c) that supports both a 1-GHz bandwidth and a 4-GHz bandwidth is being developed. Therefore, a broadband structure excluding a chip is important for the development of radar. The radar apparatus for a vehicle according to the present invention may be implemented using these hardware devices.

The input/output interface of the chip includes a differential line, which has a balanced structure. A conventional micro-strip line or waveguide has an unbalanced structure. Therefore, a balun for changing from a balanced structure to an unbalanced structure has conventionally been required.

In a millimeter-wave band, when other structures, such as a transmission line, a balun, and a power divider, are included due to a high frequency, loss is greater than that at a low frequency. When a transmission line has a smaller length or a simpler structure, loss decreases, and the overall performance of the system is improved.

The present invention may provide a low-loss structure merely by changing from a differential line, which is an input/output interface of a chip, to a dielectric waveguide, which is an interface of an antenna.

Figure 14A:
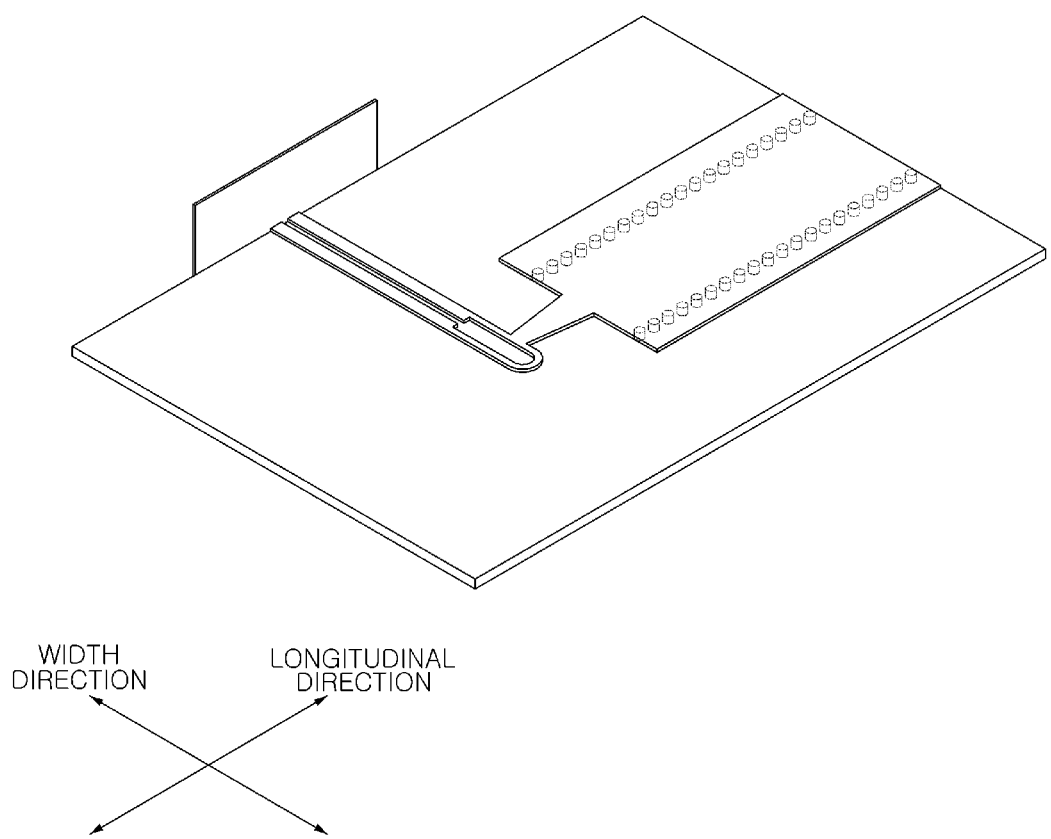
FIGS. 14a to 15b are views for explaining a differential line according to an embodiment of the present invention.
Figure 15A:
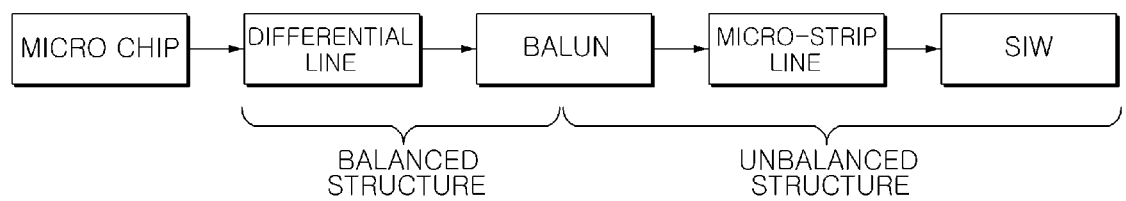

An antenna is connected to a chip so that signals in a millimeter-wave band are transmitted therebetween. A differential line is used as the medium for signal transmission. As shown in FIGS. 14a and 15a, a balun for changing from a signal of a differential line, which is a balanced line, to a micro strip may be used. However, when a balun is used, each configuration has a loss component.

Figure 14B:
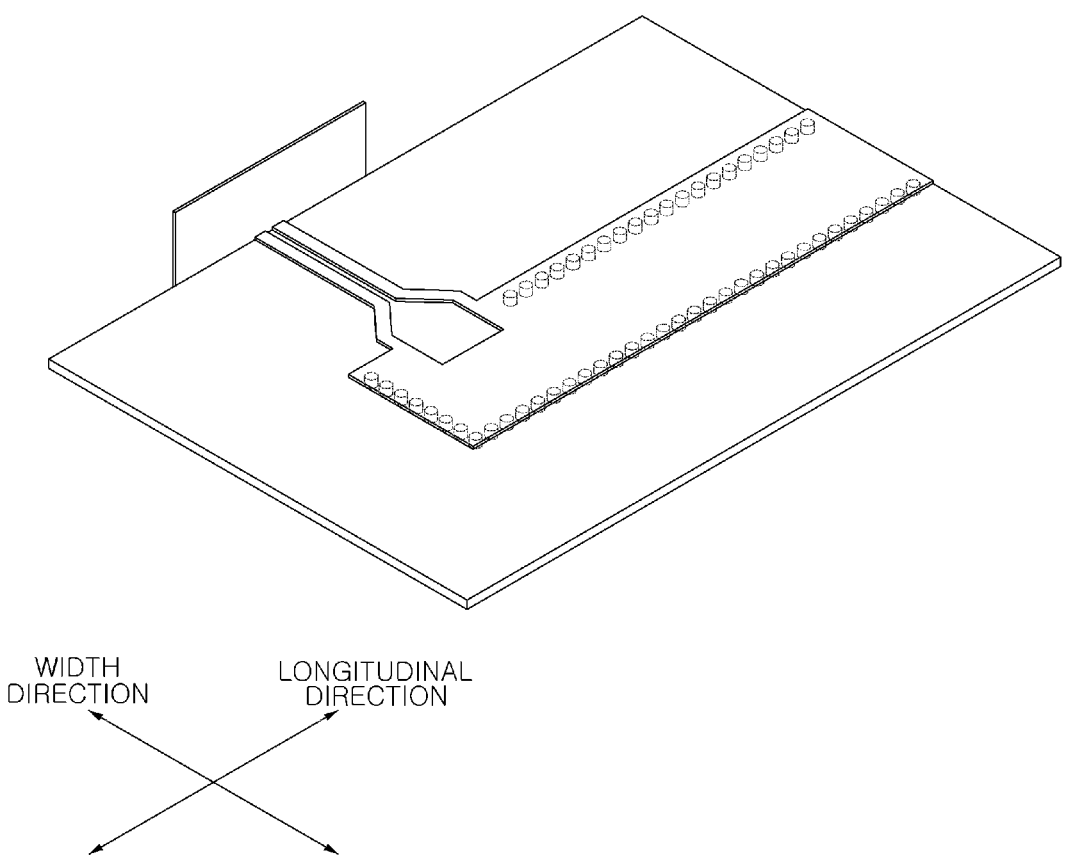
Figure 15B:
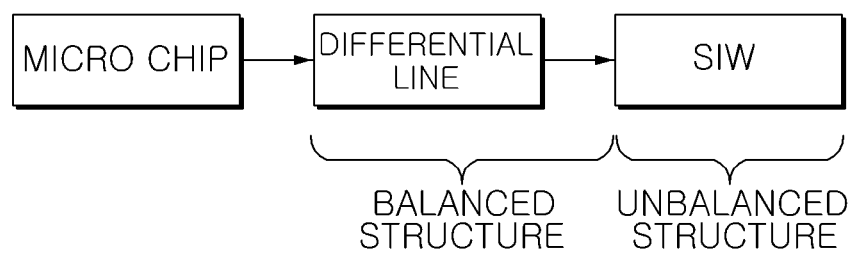

As shown in FIGS. 14b and 15b, according to the embodiment of the present invention, a differential line is directly connected to a portion of the substrate-integrated waveguide that has a balanced surface current distribution in a TE10 mode. For example, slots may be formed at appropriate positions of the substrate-integrated waveguide, and a pair of lines constituting a micro-strip line may be disposed between the slots. In this case, a balun is not required. The structure of the vehicle radar is simplified, loss is reduced, and the efficiency of the entire system is improved. As a result, the detection distance of the radar may be increased.

Reference numeral 1510 in FIG. 16 denotes data indicating insertion loss in FIG. 14a, and reference numeral 1520 denotes data indicating insertion loss in FIG. 14b. The case of FIG. 14b shows an improvement of 0.15 dB compared to the case of FIG. 14a.

The above embodiments are to be construed in all aspects as illustrative and not restrictive. It is intended that the present invention cover the modifications and variations of this invention provided they come within the scope of the appended claims and their equivalents.

DESCRIPTION OF REFERENCE NUMERALS

10: vehicle
50: radar for vehicle

The invention claimed is:

1. A radar for a vehicle configured to detect an object around a vehicle using an antenna, the radar comprising:
   a slot antenna comprising a substrate-integrated waveguide (SIW) in which a plurality of bent slots are provided;
   at least one processor electrically connected to the slot antenna; and
   a differential line electrically connecting the slot antenna to the at least one processor,
   wherein the differential line comprises:
      a first line extending from a portion of the SIW in a width direction of the SIW, and
      a second line spaced apart from the first line and extending from a portion of the SIW in the width direction,
   wherein a center line of the first line is located at a point spaced apart from a short-circuited surface of the SIW by a fourth of a guide wavelength in a longitudinal direction of the SIW.

2. The radar of claim 1, wherein a center line of the second line is formed at a point spaced apart from the center line of the first line by half the guide wavelength in the longitudinal direction.

3. The radar of claim 2, wherein the SIW comprises:
   a first metal plate;
   a second metal plate configured to be in electrical communication with the first metal plate via a plurality of via holes; and
   a dielectric located between the first metal plate and the second metal plate.

4. The radar of claim 3, wherein the plurality of bent slots are provided in the first metal plate.

5. The radar of claim 3, wherein the via holes are removed around a portion of the SIW in which the differential line is formed.

6. The radar of claim 1, wherein the second line is formed symmetrically to the first line with respect to an imaginary line formed between the first line and the second line.

7. The radar of claim 6, wherein the first line comprises:
   a first sub line extending from the SIW in the width direction;
   a second sub line extending from the first sub line toward the second line while forming an acute angle or an obtuse angle with the first sub line; and
   a third sub line extending from the second sub line in the width direction.

8. The radar of claim 7, wherein a connection portion between the first sub line and the second sub line is formed so as to be rounded, and
   wherein a connection portion between the second sub line and the third sub line is formed so as to be rounded.

9. The radar of claim 6, wherein the second line comprises:
   a first sub line extending from the SIW in the width direction;
   a second sub line extending from the first sub line toward the first line while forming an acute angle or an obtuse angle with the first sub line; and a third sub line extending from the second sub line in the width direction.

10. The radar of claim 1, wherein the SIW comprises a slot provided between the first line and the second line.

11. The radar of claim 1, wherein the SIW comprises:
a first slot extending in a longitudinal direction of the SIW;
a second slot extending from an end of the first slot in a direction different from the longitudinal direction; and
a third slot extending from an end of the second slot in the longitudinal direction.

12. The radar of claim 11, wherein an imaginary center line in a horizontal direction of the first slot is spaced apart from an imaginary center line of the SIW, which extends in the longitudinal direction, in a first direction.

13. The radar of claim 12, wherein a center line in a horizontal direction of the third slot is spaced apart from the imaginary center line in a direction opposite the first direction.

14. The radar of claim 13, wherein at least a portion of the second slot intersects the imaginary center line.

15. The radar of claim 1, wherein each of the plurality of bent slots has a length corresponding to a half wavelength of a resonant frequency for transmitting and receiving electromagnetic waves.

16. A radar for a vehicle configured to detect an object around a vehicle using an antenna, the radar comprising:
a slot antenna comprising a substrate-integrated waveguide (SIW) in which a plurality of bent slots are provided;
at least one processor electrically connected to the slot antenna; and
a differential line electrically connecting the slot antenna to the at least one processor,
wherein the SIW comprises:
a first bent slot provided such that a center thereof is located at a point spaced apart from a short-circuited surface by half a guide wavelength in a longitudinal direction of the SIW, and
a second bent slot provided such that a center thereof is located at a point spaced apart from the center of the first bent slot by the guide wavelength in the longitudinal direction.

17. A radar for a vehicle configured to detect an object around a vehicle using an antenna, the radar comprising:
a slot antenna comprising a substrate-integrated waveguide (SIW) in which a plurality of bent slots are provided;
at least one processor electrically connected to the slot antenna; and
a differential line electrically connecting the slot antenna to the at least one processor,
wherein the plurality of bent slots makes a surface current of the substrate-integrated waveguide discontinuous.

* * * * *